W. G. BROWNSON & D. C. SHULL.
TELEGRAPH REPEATING INSTRUMENT.
No. 66,945.                               Patented July 23, 1867.
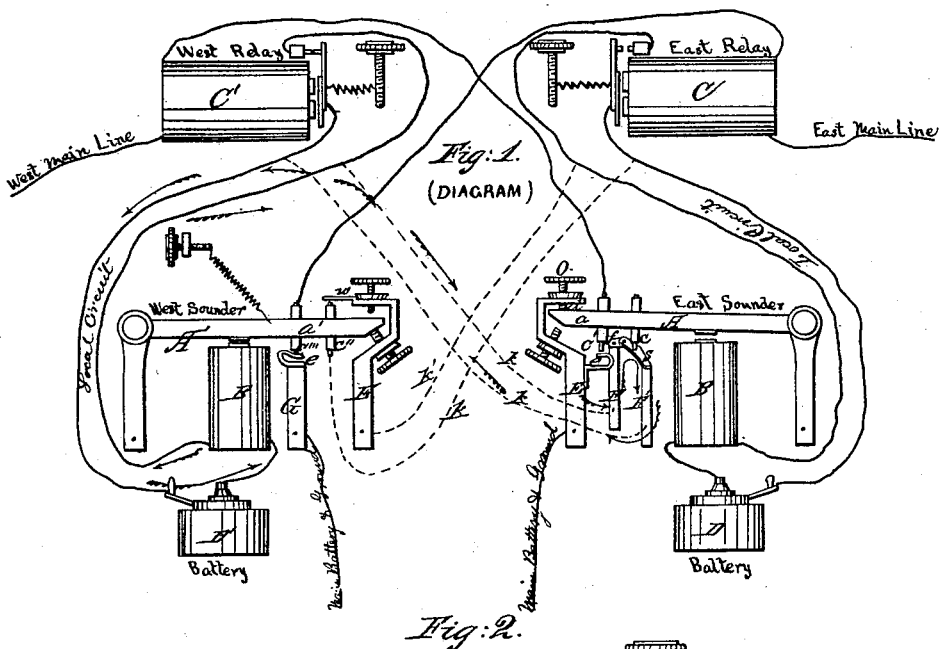
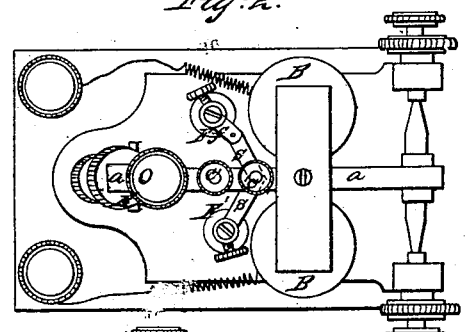
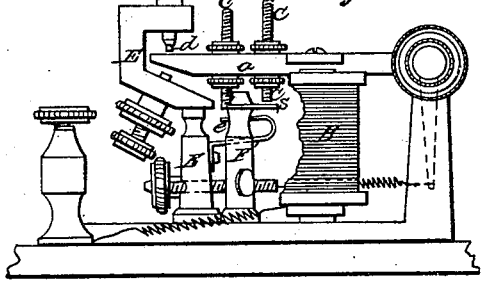
Witnesses:
J. C. Hunter
H. H. Young
Inventors:
W. G. Brownson
and
D. C. Shull
By David A. Burr
Atty.

United States Patent Office.

WALTER G. BROWNSON AND DANIEL C. SHULL, OF WELLSVILLE, OHIO.

*Letters Patent No. 66,945, dated July 23, 1867.*

IMPROVEMENT IN TELEGRAPH REPEATING INSTRUMENTS.

*The Schedule referred to in these Letters Patent and making part of the same.*

TO ALL WHOM IT MAY CONCERN:

Be it known that we, WALTER G. BROWNSON and DANIEL C. SHULL, of Wellsville, Columbiana county, State of Ohio, have invented certain new and useful Improvements in the Construction of Telegraphic Repeating Instruments; and we do hereby declare the following to be a full and exact description thereof, reference being had to the accompanying diagram and drawings, illustrating the same, in which—

Figure 1 is a diagram illustrating the connections and operation of our improved repeaters.

Figure 2, a plan view of our repeater, and

Figure 3 a side elevation thereof.

Similar letters indicate like parts in each of the figures.

Our invention consists, first, in combining the main wire of any one telegraph line entering an office with the armature-lever of the repeating sounder of any other line therein, (for instance line west with sounder of line east,) in such a manner that the vibration of said sounder-lever, under the influence of signal-currents from its own line east, shall connect and disconnect the main-line wire west to or from a ground-wire, and by thus closing and opening said main west line, cause a repetition of the east signals through the same; second, in keeping the west line sounder closed, (while east is working as just described,) by closing its local circuit when its relay is open, through cut-off wires attached to the local circuit wires between said sounder and relay, combined with connecting points on the east sounder-lever, in such manner as to be closed thereby whenever east line is open, and *vice versa;* and third, in maintaining a continuous connection of the local circuit, either through the relay or the cut-off wires, by the use of spring connections between the ends of the cut-off wires, and between the main-line wire and ground-wire at the operating sounder.

Similar combinations are made, both of west sounder with east line and of east sounder with west line, in the manner hereinafter more particularly described, so that east may repeat west or west east, at pleasure, the sounder of the one line being kept closed, by the action of its own local circuit, whilst the other line is open.

To enable others skilled in the art to make and use our invention, we will proceed to describe its construction and operation.

Our improvements are readily applied to the ordinary forms of telegraphic repeaters or sounders; A, in the accompanying drawings, representing such a repeater, having its magnet B connected with any suitable relay C and local battery D, as is customary in the present arrangements of telegraphic apparatus. We give to the sounder-post E, of the repeater A, a ground-w connection, and to any suitable portion of this post, below the sounder-lever $a$, we secure a straight or bent spring, $e$, an interval being left between the upper edge of the spring and said lever. Through apertures in the lever $a$ we insert and secure two metallic pins or strips $c\ c'$, which are, however, carefully and completely insulated from said lever by the use of any suitable insulating material. One of these pins, $c'$, is of such length and is so placed as that when the sounder $a$ is closed or drawn down by the action of its magnet B, the lower end of the pin shall bear down upon the spring $e$ of post E, but when the lever is open or released from its magnet B, and raised by its spring $b$, (fig. 3,) the contact between the pin $c'$ and spring $e$ will be broken. In a line between sounder-post E and the sounder-magnet B, we place two insulated "binding" or thumb-screw posts F F' on either side of the vertical plane, in which sounder-lever $a$ vibrates. To the top of one of these posts, F', is secured a horizontal elastic strip, $s$, extending across to near the top of the other post, F, and which, by its elasticity, is kept constantly in contact with a small plate, $f$, projecting therefrom, unless borne down by pressure. This elastic strip or spring-plate $s$ may be straight or curved, at pleasure. The second pin $c$, also inserted through but insulated from lever $a$, or, if simply projecting from the lever, provided with an insulated tip or point, is of such a length as that when the lever is drawn down by the action of its magnet this pin shall bear down upon the spring-piece and break its contact with the plate or post F. The point $d$ of the upper adjusting-screw D of the lever $a$ is insulated, to prevent a connection with post E when lever is open. To the upper end of pin $c'$ we attach the main line wire of any other line (say the west line) in the office, after it has passed its relay C', so that when sounder $a$ is closed by signal from its line, (the east line in this instance,) a ground connection is made for the west main-line through pin $c'$, spring $e$, and post E, this connection being broken when sounder is open, as shown in diagram, fig. 1. To the sounder-post F' we connect a cut-off wire, $k$, which is also attached to one of the wires extending from the local battery to the sounder-magnet and relay of the second (or west) line, at a point between the relay and sounder-magnet, fig. 1. To the post F we connect a second cut-off wire, $k$, which is also attached to the other wire of the local circuit of the second line, at a point between its local battery and relay, (fig. 1.) Hence when the east sounder-lever $a$ is open, the local circuit of west line is kept closed, through these cut-off wires $k\ k$, by means of posts F and F' and its transverse spring $s$, as illustrated in the diagram, fig. 1, of the accompanying drawings. In said diagram we have illustrated, in connection with sounder-lever $a'$ of west line, another form of arrangement by which one pin $c'''$ through said lever is made to connect by its movements the east main line with a ground wire, and the second pin $c''$ opens and closes the local circuit operating east sounder. Instead of making in this arrangement, a ground-connection through the sounder-post E, this post is connected with one of the cut-off wires $k'$ from east local circuit, and a spring, $w$, projecting from its upper end, is so arranged as to be in contact with and bear down upon the insulated pin $c''$ in the lever whilst said lever is open, so that the east local circuit through the cut-off wires $k'\ k'$ is closed thereby whenever the lever is open, but opened whenever the lever is drawn down by the action of its magnet. In this case ground connection is obtained for the east main-line wire, through the second point $c'''$ of lever, by means of a separate ground-connecting post, G, placed under the pin, its upper end being provided with a spring, $e'$, through which the connection between pin and post is established when the lever is drawn down. We prefer, however, the form of arrangement illustrated in figs. 2 and 3 and first described, and to make in all cases the repeaters for all the lines alike.

The operation of our improved repeater is simple and effective. With east line open, a signal from east acting through its relay C upon sounder-magnet B, will close the sounder-lever $a$, thus bringing pin $c'$, attached to main line west, into contact with spring $e$ of post E, having a direct ground connection. By thus closing west line, the signal from east is repeated west. In the mean time west sounder A' is kept closed by the action of local battery on magnet B', the local circuit being completed or closed, first, when east sounder is open through cut-off wires $k\ k$ by contact of spring $s$ from post F', (to which one wire is attached,) with plate $f$ of post F, to which the other is secured; and second, when said east sounder is closed, and consequently the circuit through cut-off wires $k$ broken by pressure of $c$ upon connecting-spring $s$, breaking contact of $s$ with plate $f$, then through the west relay C', which is made to close the local circuit by the very signal which breaks its connection through said cut-off wires $k\ k$. As the point $c'$, by which the west line is opened, touches the spring $s$, and thus closes the west local circuit through relay C' before point $c$ breaks the connection through spring $s$ and the cut-off wires, the west sounder cannot open unless a break is made by operator on the west line. The operation of the several features of our improvement are the same when west is repeating east instead of east west, as has just been described; the west sounder or repeater in such case operating in the manner just specified in relation to the movements of the east sounder. It is evident that any two lines in an office may be thus connected through same repeaters by suitable switches, and by changing attachments of wires to the points $c\ c'$ and posts E F F', (or E G,) &c., and we contemplate such changes in the use and application of our invention.

Having thus fully described our invention, what we claim therein as new, and desire to secure by Letters Patent, is—

1. The combination of the local-battery circuit of any one of two main lines, in a telegraphic system, with the repeater of the other line, by means of extra wires intercepting the local current between the sounder-magnet and relay of first line, and so arranged as that said local circuit may be closed by the lever of the repeater when not closed by the armature-lever of said relay, and *vice versa*, substantially in the manner and for the purpose herein set forth.

2. Metallic pins or rods passing through or secured to the sounder-lever of a telegraphic repeater, in combination with the wires of a local circuit and a main line, and operating to open or close said line or circuit by the movements of said lever, substantially in the manner and for the purpose herein set forth.

3. The combination of a main-line wire with a pin or rod on the sounder-lever of a telegraphic repeater, and with a ground-connecting spring or wire, so placed, within reach of said pin, as to be in contact therewith when the sounder is closed, substantially in the manner and for the purpose herein set forth.

4. We claim elastic plates, strips, or springs, $e$ and $s$, (or $e$ and $w$,) in combination with posts F F' and ground-connecting post E, (or G,) and also, respectively, with insulated pins $c$ on sounder A, and insulated point on adjusting-screw $o$ of sounder-post E, when so arranged as that in the movements of the sounder the contact of one point with its corresponding spring shall not be broken until contact is established between the second point and its spring, substantially in the manner and for the purpose herein set forth.

The foregoing specification of our improvement in telegraphic repeaters signed by us this sixth day of April, A. D. 1867.

W. G. BROWNSON,
D. C. SHULL.

Witnesses:
Jno. Thomas,
F. A. Sanders.